(12) United States Patent
Kramer et al.

(10) Patent No.: US 6,725,548 B1
(45) Date of Patent: Apr. 27, 2004

(54) KEYLESS BLADE CLAMP MECHANISM

(75) Inventors: Scott G. Kramer, Milwaukee, WI (US); Thomas R. Bednar, Pewaukee, WI (US); Richard H. Jungmann, Richfield, WI (US); Jeffary R. Sonnentag, Franklin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 283 days.

(21) Appl. No.: 09/654,198

(22) Filed: Sep. 1, 2000

Related U.S. Application Data

(63) Continuation of application No. 09/142,131, filed as application No. PCT/US97/03633 on Feb. 28, 1997, now abandoned.
(60) Provisional application No. 60/021,470, filed on Jul. 10, 1996, and provisional application No. 60/012,598, filed on Mar. 1, 1996.

(51) Int. Cl.[7] .................................................. B27B 3/30
(52) U.S. Cl. ........................ 30/392; 30/335; 83/699.21; 279/75
(58) Field of Search .......................... 30/392, 335, 393; 279/75, 81; 83/699.21

(56) References Cited

U.S. PATENT DOCUMENTS

| | | | | |
|---|---|---|---|---|
| 666,511 A | * | 1/1901 | Furbish ........................ 279/75 |
| 3,024,032 A | * | 3/1962 | Nixon .......................... 279/81 |
| 3,398,965 A | * | 8/1968 | Cox ............................. 279/81 |
| 3,750,283 A | | 8/1973 | Hoffman |
| 4,020,555 A | * | 5/1977 | Hedrick ........................ 30/335 |
| 4,204,692 A | * | 5/1980 | Hoffman ....................... 279/81 |
| 4,441,255 A | * | 4/1984 | Hoffman ....................... 30/392 |
| 4,691,929 A | * | 9/1987 | Neumaier et al. ........... 279/19.3 |
| 4,813,829 A | * | 3/1989 | Koppelmann ................ 279/81 |
| 5,103,565 A | * | 4/1992 | Holzer, Jr. .................... 30/392 |
| 5,306,025 A | | 4/1994 | Langhoff |
| 5,443,276 A | | 8/1995 | Nasser et al. |
| 5,487,221 A | * | 1/1996 | Oda et al. ..................... 30/392 |
| 5,575,071 A | | 11/1996 | Philips et al. |
| 5,644,846 A | * | 7/1997 | Durr et al. .................... 30/393 |
| 5,903,983 A | * | 5/1999 | Jungmann et al. ............ 30/392 |
| 5,934,846 A | * | 8/1999 | Ishii ............................ 279/81 |
| 5,946,810 A | * | 9/1999 | Hoelderlin et al. ........... 30/392 |
| 5,954,347 A | * | 9/1999 | Buck et al. .................... 279/75 |
| 5,971,403 A | * | 10/1999 | Yahagi et al. ................. 279/75 |
| 5,984,596 A | * | 11/1999 | Fehrle et al. ................. 279/75 |
| 5,988,957 A | * | 11/1999 | Wheeler ....................... 279/75 |
| 5,989,257 A | * | 11/1999 | Tidwell et al. ................ 279/75 |
| 5,996,452 A | * | 12/1999 | Chiang ........................ 279/75 |

FOREIGN PATENT DOCUMENTS

| | | | | |
|---|---|---|---|---|
| DE | 3713208 | | 11/1988 | .......... B27B/19/00 |
| EP | 0544129 | | 6/1993 | .......... B23D/51/10 |
| EP | 0623413 | | 11/1994 | .......... B23D/51/10 |

* cited by examiner

*Primary Examiner*—Allan N. Shoap
*Assistant Examiner*—Omar Flores Sánchez
(74) *Attorney, Agent, or Firm*—Michael Best & Friedrich LLP

(57) ABSTRACT

A reciprocating saw comprising a reciprocatable spindle having an end adapted to receive a saw blade, and a blade clamp mechanism connected to the spindle and adapted to attach the saw blade to the spindle. The blade clamp mechanism includes an actuating member mounted on the end of the spindle, a locking member operatively associated with the actuating member, and a biasing member interconnected with the actuating member for biasing the actuating member toward an engaged position. A cover encloses a substantial portion of the biasing member. A housing, made from a thermally insulative material, is mounted to the actuating member. An ejecting member is interconnected with the spindle and is capable of engaging the saw blade such that the saw blade is urged away from the end of the spindle.

29 Claims, 5 Drawing Sheets

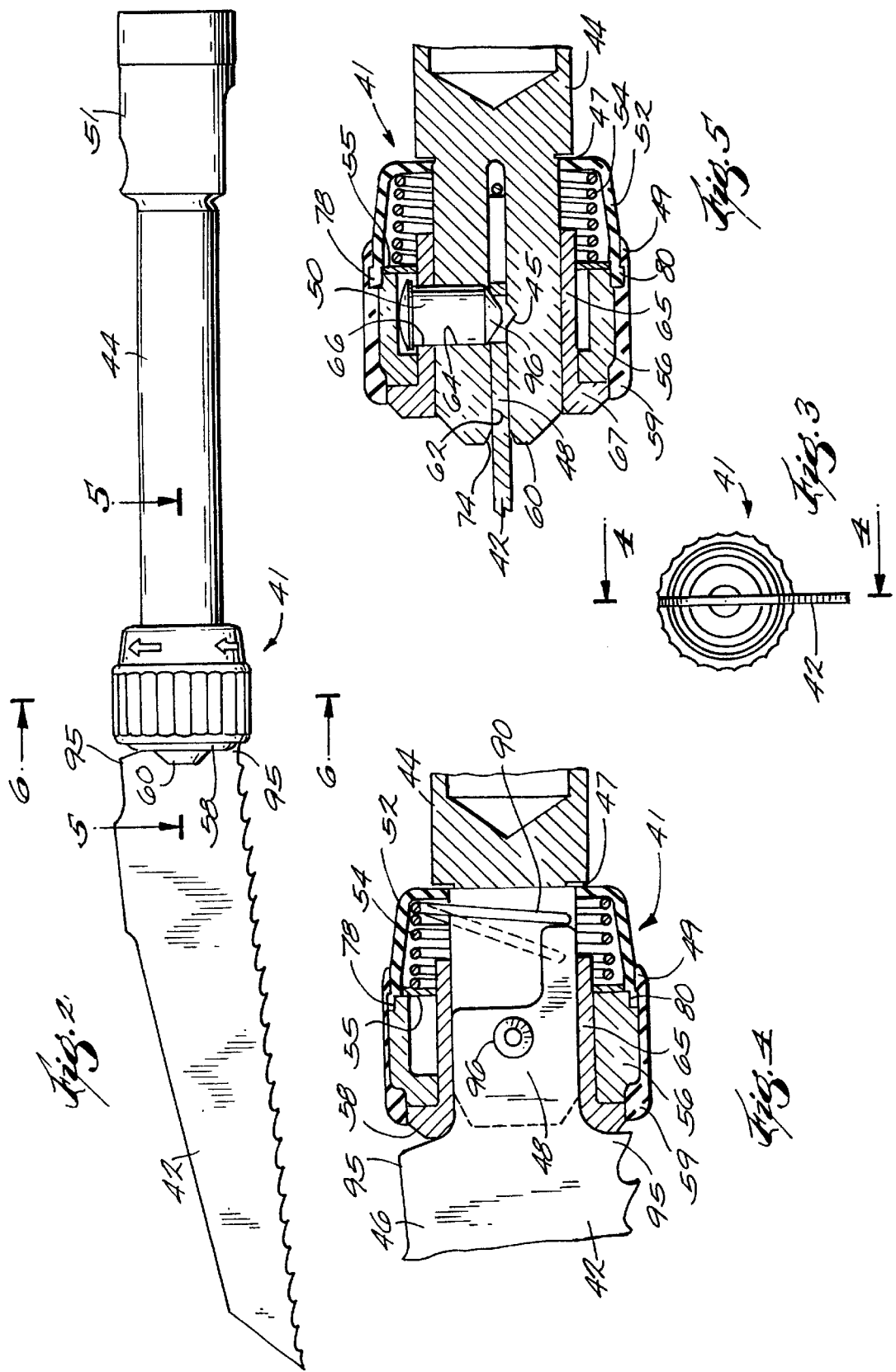

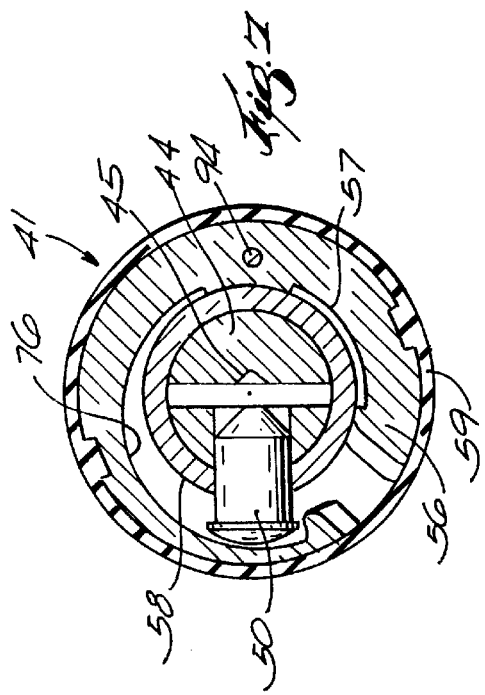
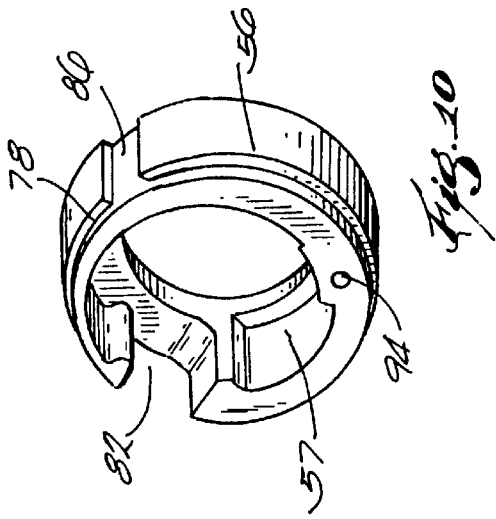
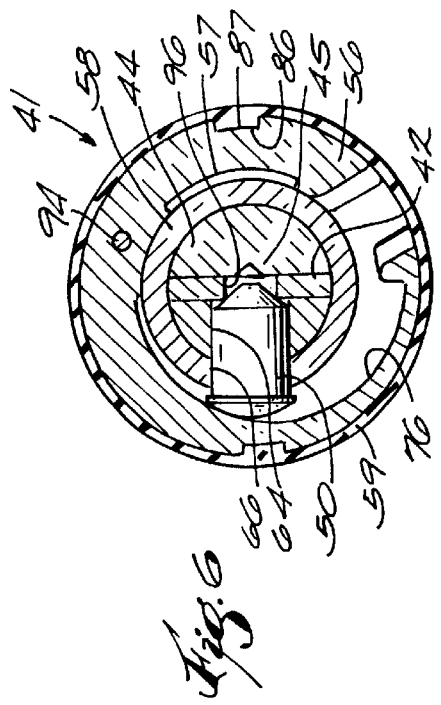
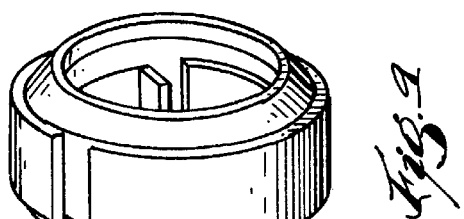
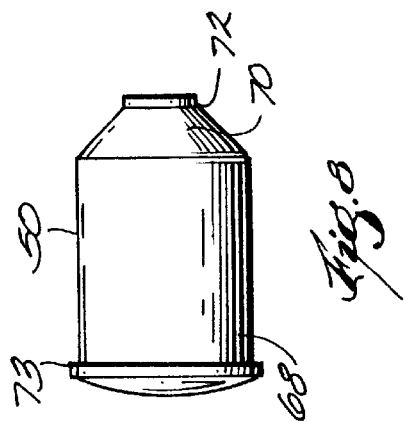

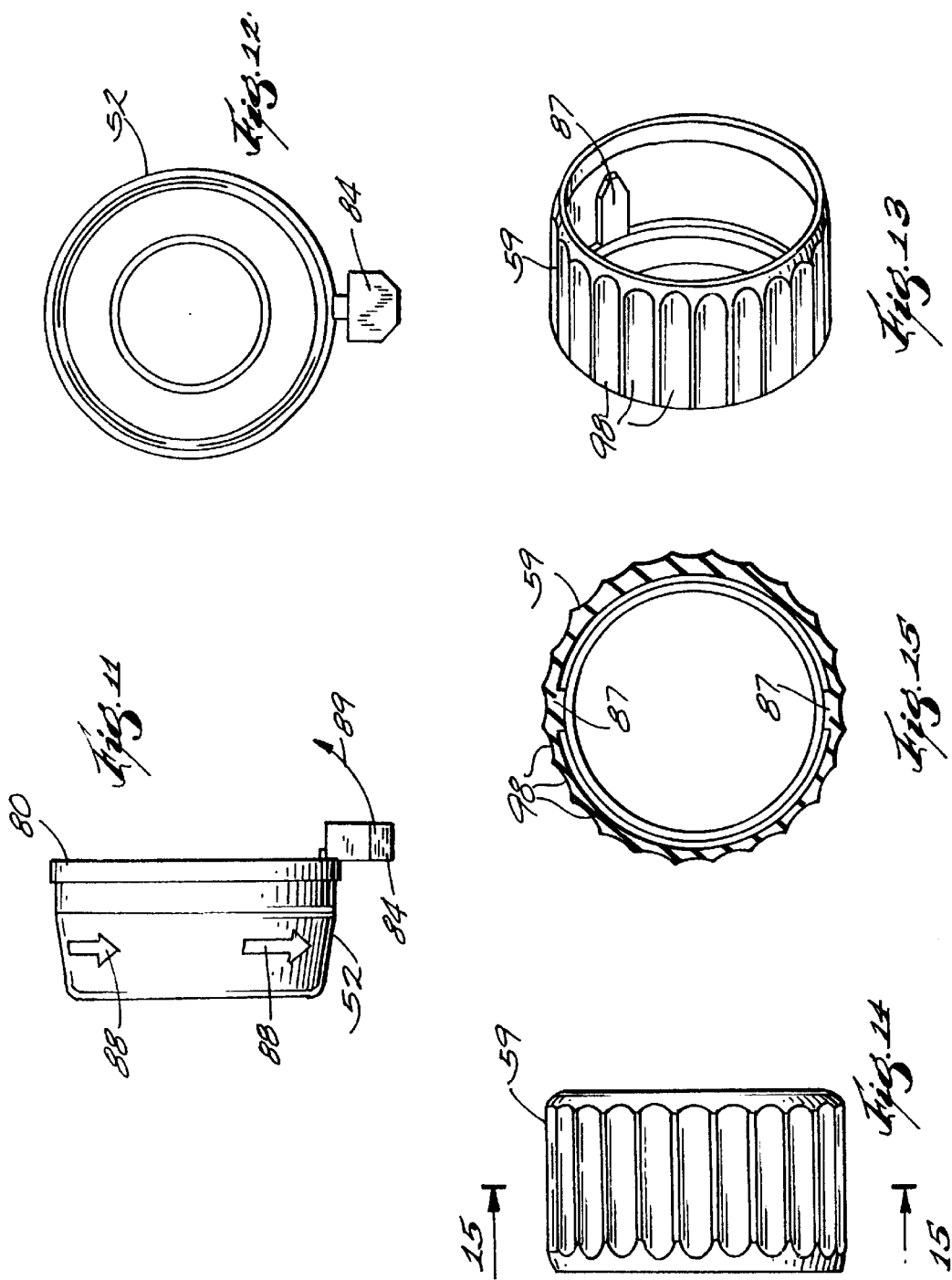

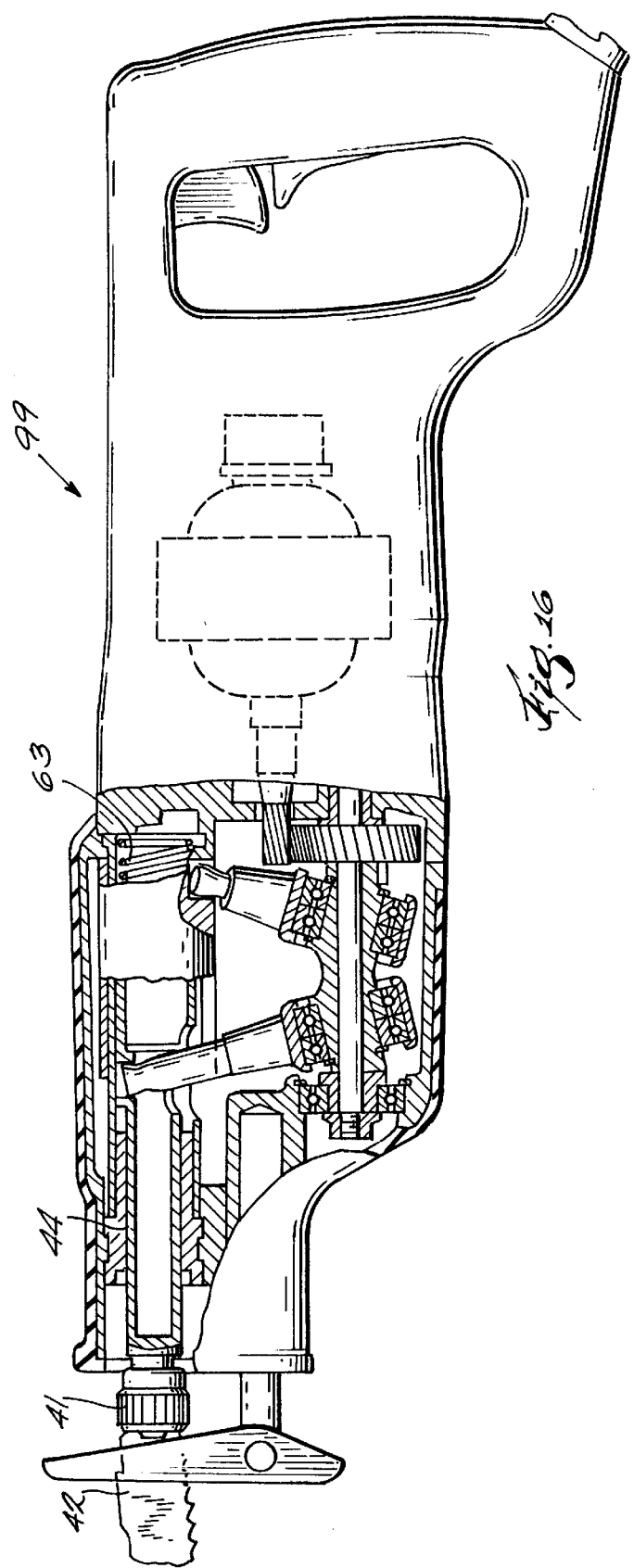

KEYLESS BLADE CLAMP MECHANISM

RELATED APPLICATIONS

This application is a continuation of prior filed utility patent application Ser. No. 09/142,131, filed on Sep. 1, 1998 now abandoned; which was filed as a national stage application under 35 U.S.C. 371 of PCT/US97/03633, filed on Feb. 28, 1997; which claimed the benefit of provisional patent application serial No. 60/021,470, filed on Jul. 10, 1996; which claimed the benefit of provisional patent application serial No. 60/012,598, filed on Mar. 1, 1996.

FIELD OF THE INVENTION

The present invention relates to reciprocating saws and more specifically to a keyless blade clamp for quickly and easily replacing and securing a saw blade to a spindle of a reciprocating saw.

BACKGROUND OF THE INVENTION

Hand held reciprocating tools, such as electric reciprocating saws, include removable blades, which permits the use of different cutting edges as may be necessary for cutting different materials and for the replacement of worn or damaged blades. This requires a blade mounting system that allows rapid blade replacement while accurately and firmly coupling the blade to the tool. Typically, blade mounting systems require a tool, such as an allen wrench or a special key, in order to replace and secure the blade. This is a slow and often difficult process.

Recently, blade clamps have been developed that do not require a tool. These clamps are commonly called keyless blade clamps. While many existing keyless blade clamps are a vast improvement over standard blade clamps that require tools, there is still a need for keyless blade clamps that are easy to manufacture, simple to use, and long-lasting.

SUMMARY OF THE INVENTION

There are several aspects of the present invention, each of which is summarized below.

In one aspect, the present invention provides a reciprocating saw comprising a reciprocatable spindle having an end adapted to receive a saw blade, and a blade clamp mechanism connected to the spindle and adapted to attach the saw blade to the spindle. The blade clamp mechanism includes an actuating member mounted on the end of the spindle, a locking member operatively associated with the actuating member, a biasing member (e.g., a torsional coil spring) interconnected with the actuating member for biasing the actuating member toward an engaged position, and a cover enclosing a substantial portion of the biasing member. By virtue of the use of a cover, the biasing member is at least partially protected from obstruction, contamination or tampering, which may interfere with the operation of the spring.

In another aspect, the blade clamp mechanism includes an actuating member movably mounted on the end of the spindle, a locking member operatively associated with the actuating member and moveable relative to the spindle, a biasing member interconnected with the actuating member for biasing the actuating member toward an engaged position, and a housing mounted to the actuating member. Preferably, the housing comprises a substantially thermally insulative material (e.g., a plastic or polymeric material). The housing can further include a plurality of arcuate recesses on an exterior surface of the housing. By virtue of the provision of a housing mounted to the actuating member, heat transfer from the blade to the user is reduced. In addition, the arcuate recesses facilitate engagement of the housing by the user.

The present invention also provides a method of assembling a blade clamp mechanism for attaching a saw blade to a spindle of a reciprocating saw. The method comprises the acts of positioning an actuating member onto the spindle, aligning (e.g., rotating) the actuating member relative to the spindle such that an opening in the spindle is substantially aligned with an opening in the actuating member, inserting a locking member through the opening in the actuating member and through the opening in the spindle, and moving the tab member into the opening in the actuating member. In one embodiment, the method further includes the act of interconnecting the actuating member to a biasing member. Preferably, the method further includes the act of positioning a cover over a substantial portion of the biasing member.

In another aspect, the present invention provides a reciprocatable spindle having an end adapted to receive a saw blade, and a blade clamp mechanism connected to the spindle and adapted to attach the saw blade to the spindle. The blade clamp mechanism includes an actuating member movably mounted on the spindle, a locking member operatively associated with the actuating member and moveable relative to the spindle, and an ejecting member interconnected with the spindle and capable of engaging the saw blade such that the saw blade is urged away from the end of the spindle. By virtue of this feature, removal of the saw blade from the spindle is facilitated. This is particularly helpful if the tang of the saw blade is broken off in the spindle.

In one embodiment, the saw further includes a biasing member (e.g., a spring) interconnected with the actuating member for biasing the actuating member toward an engaged position. Preferably, the ejecting member comprises a portion of the biasing member. For example, the ejecting member can be positioned in a recess (e.g., a slot) and can engage the saw blade.

BRIEF DESCRIPTION OF THE DRAWINGS

FIG. 2 is a side view of the blade clamp of FIG. 1 in an assembled condition and clamping a saw blade.

FIG. 3 is a front view of the blade clamp of FIG. 2.

FIG. 4 is a section view taken along line 4—4 in FIG. 3.

FIG. 5 is a section view taken along line 5—5 in FIG. 2.

FIG. 6 is a section view taken along line 6—6 of FIG. 2 and showing the blade clamp in an engaged position.

FIG. 7 is the section view of FIG. 6 showing the blade clamp in a disengaged position.

FIG. 8 is a side view of a pin used with the keyless blade clamp of FIG. 1.

FIG. 9 is a front perspective view of a cam collar used with the keyless blade clamp of FIG. 1.

FIG. 10 is a rear perspective view of the cam collar of FIG. 9.

FIG. 11 is a side view of a spring cover used with the blade clamp of FIG. 1.

FIG. 12 is an end view of the spring cover of FIG. 11.

FIG. 13 is a rear perspective view of a collar housing used with the blade clamp of FIG. 1.

FIG. 14 is a side view of the collar housing of FIG. 13.

FIG. 15 is a section view taken along line 15—15 in FIG. 14.

FIG. 16 is a side view in partial cross-section of a reciprocating saw suitable for application of the present invention.

DETAILED DESCRIPTION OF THE ILLUSTRATED EMBODIMENT

Figure 1:
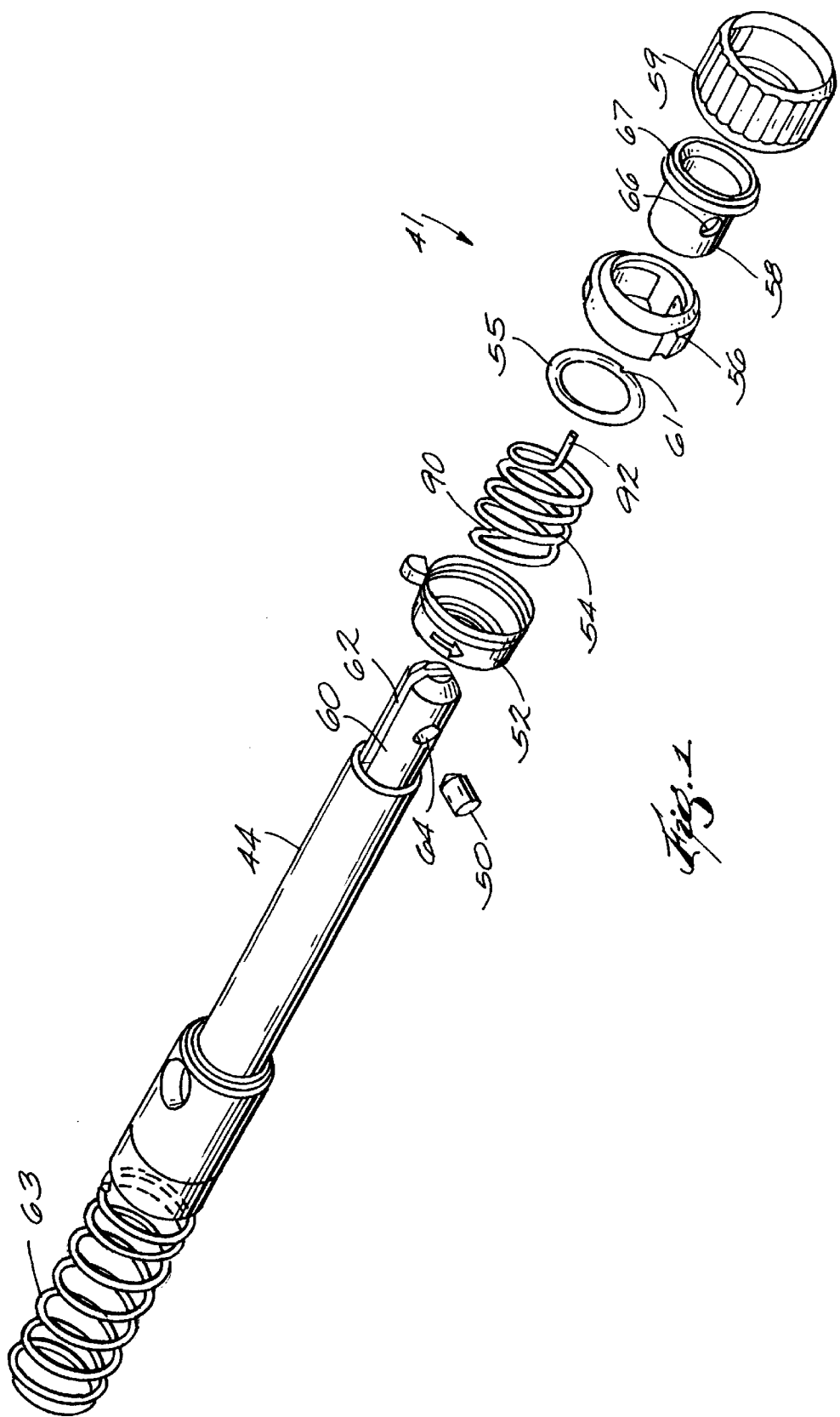
FIG. 1 is a perspective assembly view of a keyless blade clamp mechanism embodying the present invention.

FIGS. 1 through 7 illustrate a keyless blade clamp 41 embodying the present invention. The illustrated blade clamp 41 is shown mounted on a reciprocatable spindle 44, and in FIGS. 2–6 is shown engaging a saw blade 42 having a main portion 46 and a tang 48. Briefly, the blade clamp 41 includes a pin 50, a spring cover 52, a spring 54, a washer 55, a cam collar 56, a sleeve 58 and a collar housing 59.

The spindle 44 is adapted to be mounted for reciprocation within the body of a reciprocating saw 99 (FIG. 16). A drive portion 51 (FIG. 2) is adapted to be driven by a wobble plate (not shown), as is generally known in the art. The spindle 44 includes a spindle tip 60 having a slot 62 dimensional to receive the saw blade 42, and a tip orifice 64 extending laterally from an outer surface of the spindle tip 60 to the slot 62 (FIGS. 1 and 5). A compression spring 63 (FIG. 1) is provided to bias the spindle 44 toward an extended position relative to the body of the reciprocating saw.

The sleeve 58 is positioned around the spindle tip 60, and includes a cylindrical body portion 65 and a flange 67. The inner diameter of the body portion 65 is dimensioned to receive the spindle tip 60. The body portion 65 includes a sleeve orifice 66 that is aligned with the spindle orifice 64.

The pin 50 (FIGS. 1 and 4–8) is slidably positioned within the sleeve orifice 66 and the tip orifice 64. Referring specifically to FIG. 8, the pin 50 includes a cylindrical portion 68 and a conical portion 70 with a surface angled at about 450 relative to the surface of the cylindrical portion 68. The conical portion 70 includes a tip 72 that is angled at about 400 relative to the surface of the cylindrical portion 68. The pin 50 further includes a head portion 73 that limits inward movement of the pin 50 relative to the sleeve 58. The head portion 73 includes a curved outer surface that contacts the cam collar 56. As shown in FIG. 5, the spindle 44 further includes a drill point 45. The drill point 45 is a recess adapted to receive the end of the pin 50 if the pin 50 extends through the slot 62. This may occur, for example, when the pin 50 engages a saw blade 42 that is relatively thin.

As shown in FIGS. 2 and 5, the spindle tip 60 extends axially beyond the end of the sleeve 58. This is believed to provide additional support to the saw blade 42, particularly forward of the tang 48, resulting in reduced blade breakage. In addition, the spindle tip 60 includes a chamfered or radiused tip 74 (FIG. 5). The chamfered or radiused tip 74 is also believed to reduce blade breakage.

The cam collar 56 (FIGS. 6, 7, 9, and 10) is rotatably positioned over the sleeve 58, and is thereby mounted on the end of the spindle. The cam collar 56 includes a radial camming surface 76 that cooperates with the pin 50 to selectively move the pin 50 toward the slot 62 to engage the saw blade 42, as described below in more detail. The cam collar 56 is rotatable relative to the spindle 44 between an engaged position (FIG. 6), where the pin 50 is forced toward the slot 62, and a disengaged position (FIG. 7), where the pin 50 is free to move out of the slot 62. In this way, the cam collar 56 constitutes an embodiment of an actuating member that is operatively associated with a locking member, here shown as the pin 50.

The cam collar 56 further includes a recessed outer edge 78 that cooperates with the front edge 80 of the spring cover 52 (FIGS. 4 and 5). A recess 82 in the cam collar 56 (FIG. 10) cooperates with a tab member (e.g. tab 84) on the spring cover 52 (FIGS. 11 and 12). The recess 82 facilitates insertion of the pin 50 during assembly, as described below in more detail. Two opposed longitudinal grooves 86 on the outer surface of the cam collar 56 facilitate engagement of the cam collar 56 with splines 87 on the inner surface of the collar housing 59 (FIGS. 6, 13 and 15). The cam collar 56 further includes a cam collar pocket 57 that may collect contaminants during use.

The spring cover 52 (FIGS. 1, 4, 5, 11, and 12) is rotatably positioned over the spindle tip 60. The spring cover encloses a substantial portion of the spring 54, and thereby prevents outside contaminants from entering the spring and affecting the action of the spring. Contaminants, such as bits of material thrown off by the saw, between the coils of the spring could prevent proper action of the spring. Additionally, as noted above, the front edge 80 of the spring cover 52 fits around the recessed outer edge 78 of the cam collar 56. The spring cover 52 thereby forms an labyrinth seal with the cam collar 56. Further, the collar housing 59 shields the junction of the spring cover 52 and the cam collar 56.

The tab 84 on the spring cover 52 fits within the recess 82 in the cam collar 56. More specifically, during assembly, the tab 84 is designed to be bent in the direction of the arrow 89 (FIG. 11) until the tab 84 is positioned within the recess 82 in the cam collar 56 (FIG. 10) as described below in more detail. The outer surface of the spring cover 52 includes a plurality of arrows 88 that provide a visual indication of the direction the clamp is designed to be turned.

The spring 54 (FIGS. 1, 4 and 5) is positioned between the cam collar 56 and the spring cover 52. The spring 54 includes a rear leg 90 positioned within the slot 62, and a front leg 92 positioned within an orifice 94 in the cam collar 56. The spring 54 is thereby interconnected with the cam collar 56 for biasing the cam collar. The spring 54 constitutes an embodiment of a biasing member and is positioned to bias the cam collar 56 toward the engaged position.

In addition to providing a rotational bias function, the positioning of a portion of the spring 54, the rear leg 90, in the slot 62 also provides an ejection mechanism for automatically ejecting the saw blade 42 upon rotation of the cam collar 56 to the released position. More specifically, when the saw blade 42 is fully inserted into the slot 62, the tang 48 will contact the rear leg 90, and the rear leg 90 will be deflected (FIG. 4). The initial and deflected positions of the rear leg 90 are shown in FIG. 4 in dashed and solid lines, respectively. The deflection of the spring 54 provides an axial force that will urge the saw blade 42 from the slot 62 when the engagement of the clamp with the saw blade 42 is released. In this way, the rear leg 90 of the spring 54 constitutes an embodiment of an ejecting member. This feature is particularly advantageous when the main portion 46 has broken away from the tang 48.

The washer 55 (FIGS. 1, 4 and 5) is positioned between the spring 54 and the cam collar 56. The washer 55 includes a notch 61 for accommodating the front leg 92 of the spring 54. The washer 55 provides a contaminant barrier to prevent debris from entering the cam collar 56 and disturbing the interaction between the camming surface 76 and the pin 50. In addition, the washer 55 prevents the tab 84 from entering the spring cover 52 and obstructing the operation of the spring 54.

The spring 54 is a spaced torsion spring (i.e., there is space between the coils) that can be compressed from its unloaded length. This compression of the spring 54 is used to bias the washer 55 into the engagement with the cam collar 56, thereby preventing the washer 55 from rattling around inside the assembly.

The collar housing 59 (FIGS. 1, 4, 5 and 13 through 15) is positioned over both the cam collar 56 and engages the front edge 80 of the spring cover 52. The collar housing 59 further includes a clip portion 49 that snaps over the front edge 80 of the spring cover 52, to hold the spring cover 52 and the cam collar 56 in sealing engagement. Because the collar housing 59 is held forward by engagement with the front side of the cam collar 56, the collar housing thereby holds the spring cover 52 forward also. The collar housing 59 thereby performs the additional function of holding the spring cover 52 away from the spindle 44 to reduce frictional engagement of the spring cover 52 with the spindle. To aid in reducing frictional engagement of the spring cover 52 with the spindle 44, a gap 47 is left between the spring cover 52 and the spindle 44. The collar housing 59 includes a plurality of arcuate recesses 98 that facilitate engagement of the collar housing 59 by a user's hand or fingers. As noted above, the collar housing 59 also includes two opposing splines 87 that are dimensioned to engage corresponding grooves 86 in the cam collar 56, and thereby ensure that rotation of the collar housing 59 results in rotation of the cam collar 56.

The collar housing 59 performs the additional function of thermally insulating the user's hand or fingers from the heat of the blade 42, blade clamp mechanism 41, and spindle 44. Due in part to friction, various components of the reciprocating saw can heat up during use. If the collar housing 59 is made of plastic or other thermally insulative materials, then the user can be saved from an uncomfortable situation.

The saw blade 42 includes two shoulder portions 95 (FIGS. 2 and 4) that form the transition from the tang 48 to the main portion 46. When the blade 42 is inserted into the slot 62, the shoulder portions 95 will engage the sleeve 58 at two locations. The blade 42 further includes a hole 96 into which the pin 50 will be inserted to facilitate engagement of the blade 42. In this regard, the positioning of the pin 50 relative to the end of the sleeve 58 is such that the blade 42 will be held in a three-point mount between the hole 96 and the two shoulder portions 95. More specifically, when the shoulder portions 95 contact the sleeve 58 and the pin 50 is radially advanced toward the hole 96 in the blade 42, the pin 50 will contact the rear edge of the hole 96 (i.e., the edge away from the shoulder portions 95). Due to the conical portions 70 of the pin 50, such contact of the pin 50 with the rear edge of the hole 96 will cause the blade 42 to be pulled rearwardly, resulting in the shoulder portions 95 being tightened against the sleeve 58. This results in a three-point mount between the rear edge of the hole 96 and the two shoulder portions 95.

In operation, before a saw blade is inserted, the cam collar 56 is normally in the engaged position due to the biasing action of the spring 54. To insert a saw blade 42, the collar housing 59 is engaged by the user and rotated to the released position, thereby allowing the pin 50 to move out of the slot 62. The tang 48 of the saw blade 42 is then inserted into the slot 62 until the shoulder portions 95 of the saw blade 42 contacts the sleeve 58. At this point, the hole 96 in the saw blade 42 is slightly misaligned with the pin 50. The cam collar 56 is then allowed to rotate back to the engaged position due to the biasing force of the spring 54. When moving from the released position to the engaged position, the radial camming surface 76 of the cam collar 56 forces the pin 50 toward the slot 62. Because of the misalignment of the pin 50 with the hole 96 in the saw blade 42, the pin 50 contacts the rear edge of the hole 96, thereby causing the saw blade 42 to be pulled slightly rearwardly and fixedly clamped by the mechanism.

The saw blade 42 is released by rotating the cam collar 56 against the biasing force of the spring 54. This allows the pin 50 to move out of the slot 62, thereby allowing the saw blade 42 to be pulled from the slot 62.

The above-described blade clamp 41 can be assembled in the following manner. Referring to FIG. 1, the spring cover 52 and spring 54 are installed on the spindle 44 with the rear leg 90 of the spring 54 positioned within the slot 62 of the spindle 44. The washer is then slid over the spindle 44 such that the notch 61 in the washer 55 receives the front leg 92 of the spring 54. Next, the cam collar 56 is positioned onto the spindle 44 such that the orifice 94 receives the front leg 92 of the spring 54. The sleeve 58 is then slid onto the spindle 44 and the spring 54 is compressed until the sleeve orifice 66 is aligned with the tip orifice 64. Next, the cam collar 56 is aligned relative to the spindle by rotating the cam collar 56 in the direction of the arrows 88 until the recess 82 is aligned with the sleeve orifice 66 and thereby aligned with the tip orifice 64. The pin 50 is then inserted through the recess 82, sleeve orifice 66, and the tip orifice 64. The cam collar 56 is then released. The tab 84 is then moved, such as by bending the tab 84 about 900, into the recess 82. The tab 84 will help prevent the pin 50 from moving back into the recess 82. Finally, the collar housing 59 is slid over the cam collar 56 such that the splines 87 in the collar housing 59 engage the grooves 86 on the cam collar 56 until the collar housing 59 snaps onto the spring cover to hold the clamp mechanism 41 in place as a unit.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of assembling a blade clamp mechanism for attaching a saw blade to a spindle of a reciprocating saw, the blade clamp mechanism including an actuating member, a locking member, and a tab member, said method comprising the acts of:

positioning the actuating member onto the spindle;

aligning the actuating member relative to the spindle such that an opening in the spindle is substantially aligned with an opening in the actuating member;

inserting the locking member through the opening in the actuating member and through the opening in the spindle; and moving the tab member into the opening in the actuating member.

2. The method of claim 1, wherein said aligning act includes the act of rotating the actuating member relative to the reciprocating spindle.

3. The method of claim 1, wherein the blade clamp mechanism further includes a biasing member, and wherein said method further comprises the act of interconnecting the actuating member to the biasing member.

4. The method of claim 3, wherein the blade clamp mechanism further includes a cover, and wherein said method further comprises the act of positioning the cover over a substantial portion of the biasing member.

5. The method of claim 1, wherein the blade clamp mechanism further includes a housing, and wherein said method further comprises the act of mounting the housing over the opening in the actuating member after said moving act.

6. The method of claim 1, wherein the blade clamp mechanism further includes a housing, and wherein said method further comprises the act of placing the housing over a substantial portion of the actuating member.

7. A reciprocating saw comprising:
   a reciprocatable spindle having an end for receiving a saw blade; and
   a blade clamp mechanism connected to said spindle and operable to attach the saw blade to said spindle, said blade clamp mechanism including
      an actuating member mounted on said end of said spindle and rotatable relative to said spindle between an engaged position and a released position,
      a locking member operatively associated with said actuating member and moveable relative to said spindle such that, when said actuating member is in the engaged position, said locking member is engageable with the saw blade and, when said actuating member is in the released position, said locking member allows the saw blade to be released from said clamp mechanism,
      a biasing member interconnected with said actuating member for biasing said actuating member toward the engaged position, and
      a housing mounted to said actuating member.

8. The reciprocating saw of claim 7, wherein said housing is formed of a substantially thermally insulative material.

9. The reciprocating saw of claim 7, wherein said housing is formed of a plastic material.

10. A reciprocating saw comprising:
    a reciprocatable spindle having an end for receiving a saw blade; and
    a blade clamp mechanism connected to said spindle and operable to attach the saw blade to said spindle, said blade clamp mechanism including
       an actuating member mounted on said end of said spindle and rotatable relative to said spindle between an engaged position and a released position,
       a locking member operatively associated with said actuating member and movable relative to said spindle such that, when said actuating member is in the engaged position, said locking member is engageable with the saw blade and, when said actuating member is in the released position, said locking member allows the saw blade to be released from said clamp mechanism,
       a biasing member interconnected with said actuating member for biasing said actuating member toward the engaged position, and
       a housing mounted to said actuating member;
    wherein said housing includes one or more splines and said actuating member includes one or more grooves, and wherein said one or more splines engage said one or more grooves.

11. The reciprocating saw of claim 7, wherein said housing further includes a plurality of arcuate recesses.

12. A reciprocating saw comprising:
    a reciprocatable spindle having an end adapted to receive a saw blade; and
    a blade clamp mechanism connected to said spindle and adapted to attach the saw blade to said spindle, said blade clamp mechanism including
       an actuating member mounted on said end of said spindle and capable of rotating relative to said spindle between an engaged position and a released position,
       a locking member operatively associated with said actuating member and moveable relative to said spindle such that, when said actuating member is in the engaged position, said locking member can engage the saw blade and, when said actuating member is in the released position, said locking member will allow the saw blade to be released from said clamp mechanism,
       a biasing member interconnected with said actuating member for biasing said actuating member toward the engaged position,
       a cover enclosing a substantial portion of said biasing member, and
       a housing enclosing a substantial portion of said actuating member,
    wherein said housing engages said cover to form a seal, said housing and said cover, when engaged, defining an integral unit.

13. The reciprocating saw of claim 1, wherein said biasing member is a spring.

14. The reciprocating saw of claim 1, wherein said biasing member is a torsional coil spring.

15. The reciprocating saw of claim 1, further comprising a washer positioned against a portion of said biasing member.

16. The reciprocating saw of claim 1, wherein said actuating member engages said cover to form a seal.

17. The reciprocating saw of claim 1, wherein said actuating member engages said cover at a junction and said housing encloses at least part of said junction.

18. A reciprocating saw comprising:
    a reciprocatable spindle having an end for receiving a saw blade; and
    a blade clamp mechanism connected to said spindle and operable to attach the saw blade to said spindle, said blade clamp mechanism including
       an actuating member mounted on said spindle and rotatable relative to said spindle between an engaged position and a released position,
       a locking member operatively associated with said actuating member and movable relative to said spindle such that, when said actuating member is in the engaged position, said locking member is engageable with the saw blade and, when said actuating member is in the released position, said locking member allows the saw blade to be released from said clamp mechanism, and
       an ejecting member interconnected with said spindle and engageable with the saw blade such that the saw blade is urged away from said end of said spindle; and
    further comprising a biasing member interconnected with said actuating member for biasing said actuating member toward the engaged position.

19. The reciprocating saw of claim 18, wherein said biasing member is a coil spring.

20. The reciprocating saw of claim 18, wherein said ejecting member includes a portion of said biasing member.

21. The reciprocating saw of claim 20, wherein said end includes a recess, and wherein said portion is positioned in said recess and is engageable with the saw blade.

22. The reciprocating saw of claim 18, wherein said ejecting member includes at least a portion of a coil spring.

23. The reciprocating saw of claim 18, wherein said end includes a slot, and wherein said ejecting member projects into said slot.

24. A reciprocating saw comprising:
   a reciprocatable spindle having an end adapted to receive a saw blade;
   a blade clamp mechanism connected to said spindle and adapted to attach the saw blade to said spindle, said blade clamp mechanism including:
      an actuating member mounted on said end of said spindle and capable of rotating relative to said spindle between an engaged position and a released position;
      a locking member operatively associated with said actuating member and moveable relative to said spindle such that, when said actuating member is in the engaged position, said locking member can engage the saw blade and, when said actuating member is in the released position, said locking member will allow the saw blade to be released from said clamp mechanism;
      a biasing member interconnected with said actuating member for biasing said actuating member toward the engaged position;
      a cover enclosing a substantial portion of said biasing member; and
      a housing enclosing a substantial portion of said actuating member, wherein said actuating member engages said cover at a junction and said housing encloses at least part of said junction, wherein said actuating member, said cover and said housing are movable as an integral unit.

25. The reciprocating saw of claim 24, wherein said junction further defines a seal.

26. A reciprocating saw comprising:
   a reciprocatable spindle having an end for receiving a saw blade; and
   a blade clamp mechanism connected to said spindle and operable to attach the saw blade to said spindle, said blade clamp mechanism including
      an actuating member mounted on said end of said spindle for reciprocation with the spindle, said actuating member being movable relative to said spindle between an engaged position and a released position,
      a locking member operatively associated with said actuating member and movable relative to said spindle such that, when said actuating member is in the engaged position, said locking member is engageable with the saw blade and, when said actuating member is in the released position, said locking member allows the saw blade to be released from said clamp mechanism,
      a biasing member interconnected with said actuating member for biasing said actuating member toward the engaged position, and
      a housing mounted to said actuating member for reciprocation with said actuating member, said housing being engageable by an operator to move said actuating member between the engaged position and the released position, said housing being formed of a thermally insulative material.

27. The reciprocating saw of claim 26, wherein said housing is formed of a plastic material.

28. The reciprocating saw of claim 26, wherein said housing includes one or more splines and said actuating member includes one or more grooves, and wherein said one or more splines engage said one or more grooves.

29. The reciprocating saw of claim 26, wherein said housing has an outer surface including a plurality of arcuate recesses.

* * * * *